Nov. 11, 1947.   W. E. THATCHER   2,430,541
BIRD FEEDER
Filed April 22, 1944

INVENTOR.
WALTER E. THATCHER
BY
ATTORNEYS

Patented Nov. 11, 1947

2,430,541

UNITED STATES PATENT OFFICE 2,430,541

BIRD FEEDER

Walter Eugene Thatcher, East Orange, N. J.

Application April 22, 1944, Serial No. 532,233

2 Claims. (Cl. 119—51)

The present invention relates to bird feeders for use on window sills or elsewhere.

One of its objects is the provision of a bird feeder which may be affixed to a conventional window frame without permanently defacing the frame or the window sill with screws, hooks, nails and similar articles.

A further object is the provision of a bird feeder which may readily be installed on window sills and which may readily be removed therefrom without the use of tools of any sort.

Another object is the provision of a bird feeder which utilizes the window sill as its floor.

These and other objects are attained by providing two upright members adapted to be partially or wholly received by the window frame channels or tracks which carry the outer window sash, said members being held in position in said channels by means of one or more transverse bars attached to the lower part of said upright members which may protrude beyond the window frame.

The bird feeder proper which is affixed snugly to these transverse bars by means of a slot cut in each of the lower ends of the side walls or upright members, comprises two side walls whose lower ends are adapted to rest snugly upon a conventional window sill, cross pieces holding the two walls in spaced relationship with respect to one another, and a glass cover fitted into opposing grooves cut into the inner side surfaces of said walls.

Figure 1:
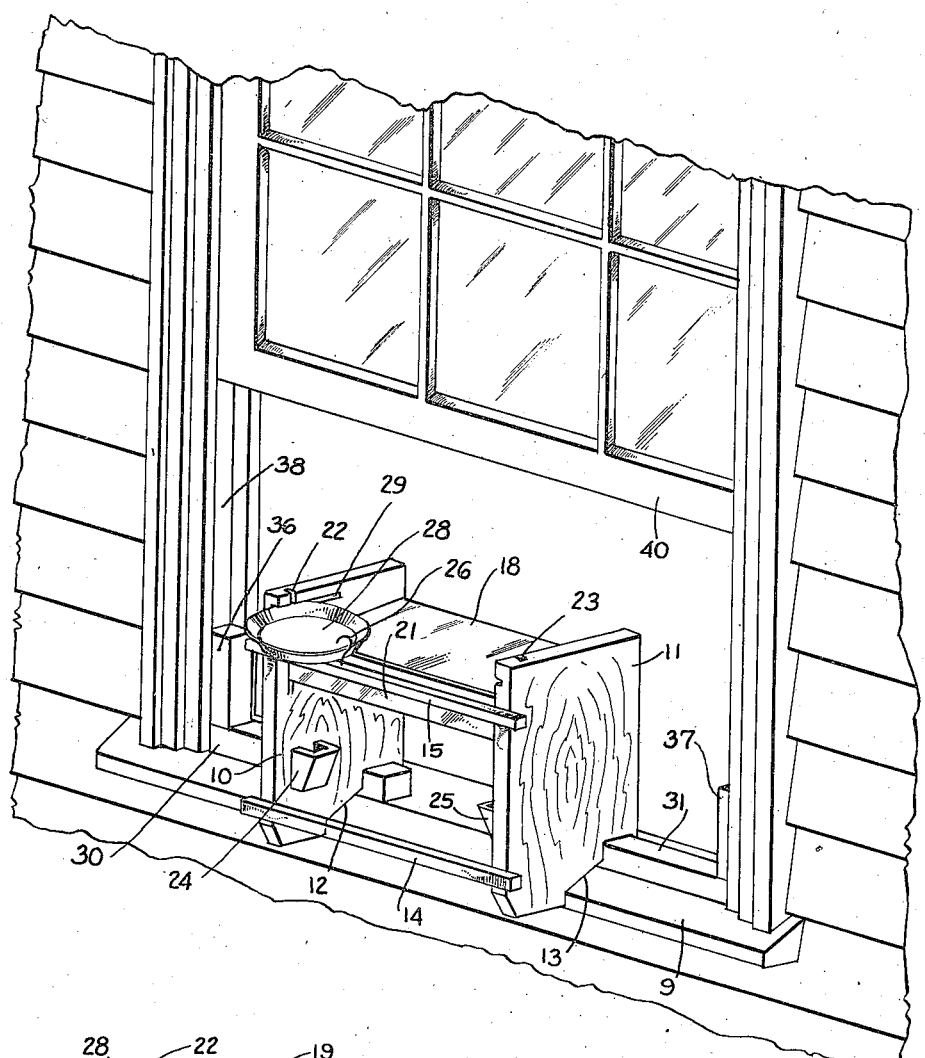

A preferred embodiment of the invention is shown in the accompanying drawing in which Figure 1 is a perspective view of the bird feeder in fixed position on a window sill.

Figure 2:
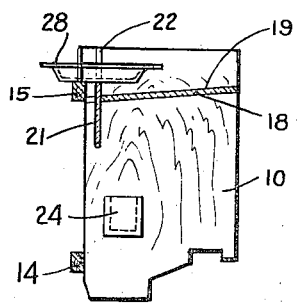

Figure 2 is a section through the bird feeder.

The bird feeder comprises two side walls 10 and 11 whose lower ends 12 and 13 are adapted to sit snugly upon a conventional downwardly sloping window sill 9. Walls 10 and 11 are held in spaced relationship vis-a-vis one another by means of cross pieces 14 and 15; these cross pieces varied in number, at will, may have the additional purpose of serving as a perch for the birds. These walls and cross pieces are made preferably of wood. The cover plate 18, which is made preferably of glass, is inserted into downwardly sloping grooves 19 which are cut into the inner facing surfaces of walls 10 and 11. An upright edge plate 21 also made preferably of glass, is inserted into side wall grooves 22 and 23 which are formed above and extending below grooves 19 and 20 and in substantially perpendicular relationship thereto.

Affixed to the inner surfaces of side walls 10 and 11 are feeders or seed troughs 24 and 25. Hooks 26 are provided in cross piece 15 to hold one or more bathing and drinking dishes or plates 28, said dishes also fitting with one of their edges into a groove 29 provided in the walls 10 and 11. The dishes 28 rest in part on crosspiece 15.

The walls 10 and 11 of the feeder are mounted on transverse bars 30 and 31, respectively. Bars 30 and 31 are firmly connected with upright members 36 and 37 which fit into the window frame channels or tracks 38 by which the outer window sash 40 is carried. Transverse bars 30 and 31 and upright members 36 and 37 are made preferably of wood.

The bird feeder is placed into position by resting it on the window sill, the transverse bars 30 and 31 being in line with the window frame channels which carry the outer window sash and the upright members 36 and 37 being inserted into these window frame channels. To remove the bird feeder, the upright members are lifted out of position within said channels and the bird feeder is simply removed from the window sill.

It is apparent that the specific illustration shown has been given by way of illustration and not by way of limitation and that the structure above described is subject to a wide variation and modification without departing from the scope or intent of the invention, all of which variations and modifications are to be included within the scope of the present invention.

What is claimed is:

1. A bird feeder construction comprising two side walls whose lower ends are adapted to rest snugly on a conventional window sill, transverse members carrying said walls, two upright members adapted to be received by the window frame channels which carry the outer window sash and connected to said transverse members, a glass cover carried by said side walls, and an upright glass member partly covering the front of the feeder, and at least one perch and at least one feeding trough carried by one of said side walls.

2. In a bird feeder construction in accordance with claim 1, a transverse member connected to said side walls, a hook affixed to said transverse member, and at least one bathing and drinking dish engaged by said hook and having an edge fitting into a groove formed in one of said side walls.

WALTER EUGENE THATCHER.

REFERENCES CITED

The following references are of record in the file of this patent:

UNITED STATES PATENTS

| Number | Name | Date |
|---|---|---|
| D. 119,588 | Hyde | Mar. 26, 1940 |
| 728,208 | Dampf | May 19, 1903 |
| 1,069,412 | Green | Aug. 5, 1913 |
| 1,751,851 | Bennett | Mar. 25, 1930 |